United States Patent Office 2,938,340
Patented May 31, 1960

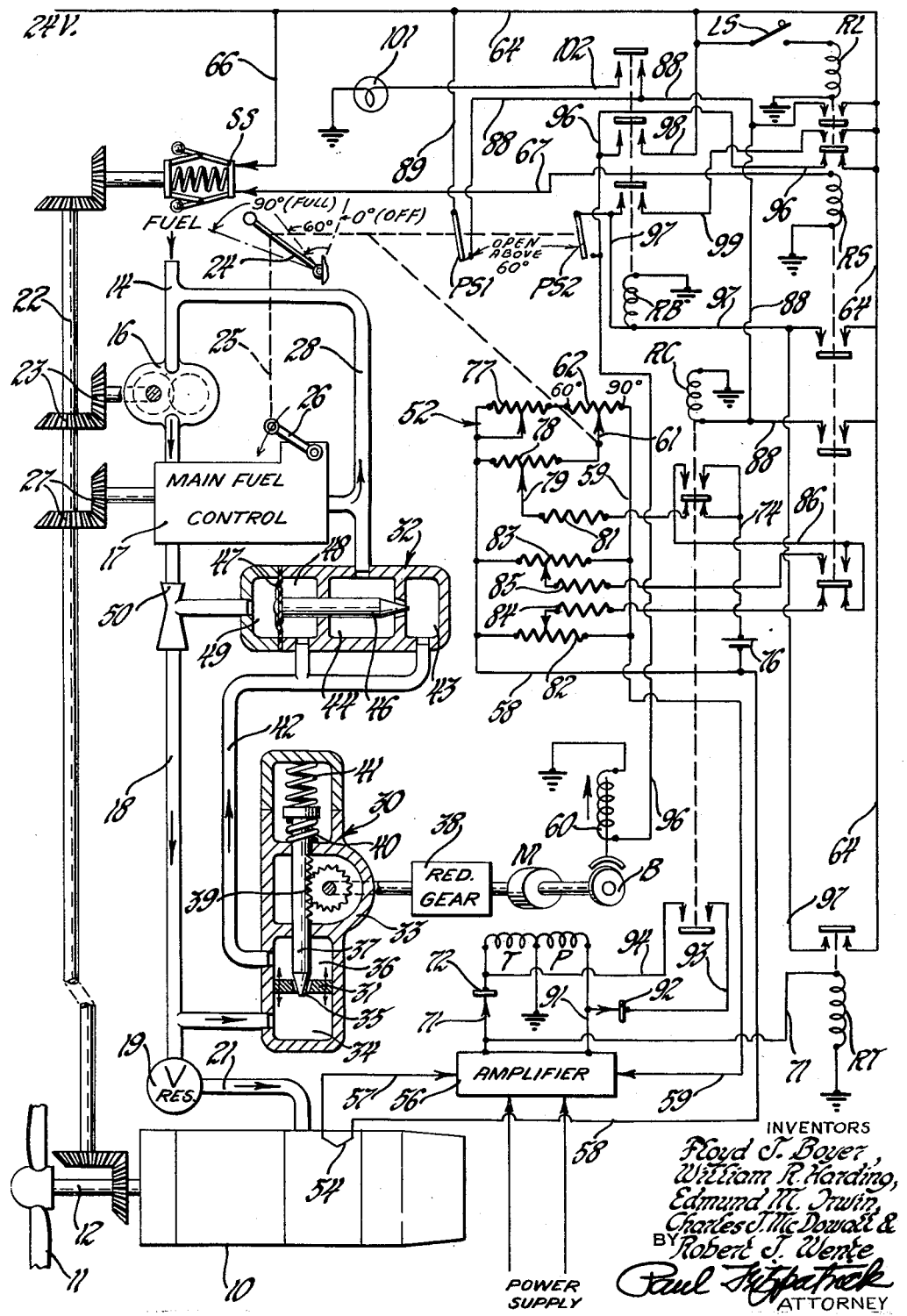

2,938,340

TEMPERATURE DATUM GAS TURBINE CONTROL

Floyd J. Boyer, William R. Harding, Edmund M. Irwin, Charles J. McDowall, and Robert J. Wente, Indianapolis, Ind., assignors to General Motors Corporation, Detroit, Mich., a corporation of Delaware Filed Mar. 23, 1955, Ser. No. 496,094

23 Claims. (Cl. 60—39.28)

Our invention is directed to controls for aircraft gas turbine, particularly those driving propellers. The invention is an improvement or carrying forward of the control system described in an application of Charles J. McDowall for "Fuel Control for Gas Turbine," Serial Number 462,188, filed October 14, 1954, of common ownership with this application.

As explained in the McDowall application, the standard turboprop fuel controls which meter fuel to the engine in accordance with the power control lever setting, inlet conditions, engine speed, and turbine inlet temperature (or other suitable controlling conditions) are not readily adapted to changes in the kind of fuel used by the engine. For that reason, the invention of the McDowall application provides a temperature responsive system to correct the flow metered by the main fuel control to compensate for over-temperature or under-temperature conditions in the engine which may result from variation in the density and heat value of fuels.

It has been discovered that very considerable advantages can be obtained, for reasons which will be explained in connection with the detailed description of the system, by certain additions to and modifications of the control system disclosed in the said prior application. These are embodied principally in, first, an arrangement by which the temperature datum control, which modifies the output of the main fuel control, may be locked under certain circumstances in its setting so that it will not depart from the setting unless this becomes necessary to protect the engine, and, second, in provisions for cutting out the part of the system which acts to increase fuel supply to the engine so that the temperature datum control then acts purely as a temperature limiting or safety override control. The provision of these features and the controls by which they are called into operation at the times when needed constitute the principal subject matter of the present invention.

The principal objects of the invention are to provide improved controls for turboprop engines adaptable to various fuels, to facilitate the operation of such engines in aircraft service, and to provide greater safety in such installations. The nature of the invention and the advantages of it will be apparent to those skilled in the art from the succeeding detailed description of the preferred embodiment of the invention.

The accompanying drawing is a schematic diagram of the hydraulic and electric circuits of a fuel control system according to the invention.

Fuel circuits

Referring to the drawing, gas turbine engine 10 drives a variable pitch propeller 11 through shaft 12. Fuel from a suitable source is supplied to the engine through line 14, pump 16, main fuel control 17, line 18, resistance valve 19, and line 21. Pump 16 may be driven by the engine through auxiliary drive shaft 22 and gears 23. The main fuel control 17 may be of any suitable known type adapted to meter fuel to the engine in accordance with ambient conditions, engine speed (or other control parameters) and power control lever setting. The control 17 may be, for example, Bendix AP–B type control. An engine speed input is fed to the control by shaft 22 and gears 27. A power control lever 24 may transmit orders to the control 17, as by the schematically indicated transmission system 25, 26. The control 17 operates to provide the scheduled fuel supply to the engine by by-passing part of the discharge of pump 16 back to the pump inlet through line 28.

To operate with the temperature datum control, the main control 17 is scheduled to pass an excess of fuel, preferably 20% above the calculated requirements. The metered output of the main control is adjusted or trimmed by the temperature datum control, which by-passes part of this output to the pump inlet.

If the datum control by-passes one-sixth of the main control output, the engine receives the assumed normal amount. Since the datum control may by-pass from zero to 50% of the fuel supplied by the main control, a wide range of fuel supply above and below the calculated normal is available.

The temperature datum control includes a motor-operated-by-pass valve 30 and a regulating valve 32. The by-pass valve may be opened or closed to by-pass more or less than 20% of the metered fuel. The regulating valve 32 maintains a pressure drop across the by-pass valve proportional to the square of total flow so that the portion of fuel by-pass is proportional to by-pass valve opening and is independent of variations in the amount of fuel metered.

The by-pass valve 30 comprises a body 33 defining chambers 34 and 36 separated by a wall 31 having an orifice 35 varied by the conical end of a plunger 37 reciprocable in the body. Plunger 37 is moved in either direction from a null (partially open) position by a motor armature M working through reduction gear 38 and rack-and-pinion drive 39. The null position is defined by springs, represented by coil springs 40 and 41, which bias the plunger toward this position from either extreme of movement. Wall 31 is adjustable longitudinally of the plunger by any suitable means to vary the opening in the null position of the plunger and thereby the proportion of fuel by-passed in the null position.

Chamber 34 is connected to engine supply line 18, and chamber 36 to the pump inlet through line 42, valve 32, and by-pass line 28.

Valve 32 is a diaphragm-controlled throttling valve. Line 42 enters chamber 43, and line 28 discharges from chamber 44. These are connected by a port varied by the conical end of plunger 46 reciprocable in the valve body under control of a diaphragm 47. The valve plunger is urged to open by pressure in chamber 48 connected to line 42 and is urged to close by pressure in chamber 49, both pressures acting on diaphragm 47. Chamber 49 is connected to the throat of a Venturi 50 in line 18.

As will be apparent, the difference between the pressures in chambers 34 and 49 is the loss in static head in the Venturi throat, which is proportional to the square of flow through the Venturi.

The pressures in chambers 36 and 48 are equal by virtue of the connection through line 42. The pressures in chambers 48 and 49 are equal because of the flexible diaphragm 47 between them. Therefore, the drop in pressure from chamber 34 to chamber 36 is proportional to the square of flow in line 18. Therefore, the flow through variable orifice 35, for any given opening, is proportional to flow in line 18.

As stated, in the null position of plunger 37, one-sixth of the flow is by-passed, leaving 100% of the computed amount to proceed to the engine.

The resistance or pressurizing valve 19 maintains a pressure drop of about 50 pounds per square inch to ensure sufficient working pressure in the control under engine conditions such that the pressure in line 21 leading to the engine fuel nozzles is very low.

Datum valve operation

The position of valve plunger 37 is determined ordinarily by the relation of engine temperature to the scheduled values. This is effected by a follow-up or servo system including a temperature scheduling potentiometer group 52, thermocouples 54 responding to turbine inlet temperature, a follow-up control thermionic amplifier 56, and motor armature M operated by coils T and P energized by the amplifier 56. Preferably a number of thermocouples are distributed around the turbine annulus. These are represented schematically in the single figure.

It will be understood that the details of the amplifier or motor control and of the motor are matters of servomechanism technique immaterial to the present invention. The amplifier may be a Bendix type ET-A amplifier.

The motor control is represented diagrammatically herein in the interest of concise exposition of the invention. This control may be as described or any suitable analogous system. For the present, it will be understood that thermocouples 54 generate a potential proportional to turbine inlet temperature. Potentiometer system 52 provides a potential indicative of desired turbine inlet temperature. These are connected in opposing series to provide an input to the amplifier by a circuit through line 57, thermocouples 54, line 58, potentiometer group 52, and line 59.

The motor M, T, P may be of any suitable type. It is illustrated here, by way of example, as being a D.C. torque motor having two field coils energized respectively for operation in opposite directions. The T or "take" coil operates the motor in the direction to by-pass more fuel; the P or "put" coil drives the valve toward closed position to by-pass less fuel and thus put more into the engine. Armature M is also coupled to a brake B which is normally engaged and is released by energization of a solenoid 60. In normal operation, the amplifier may drive the motor in either direction. Greater energization of coil T than coil P takes fuel, and vice versa.

Motor M, T, P, valves 19, 30 and 32, and venturi 50 may be elements of a Bendix type PB-A2 temperature datum valve.

Datum valve control system

Under certain conditions, it is desirable to use the motor only for temperature limiting control; that is, to take fuel if engine temperature is excessive. It is also desirable at times to brake the motor to prevent fuel adjustment by the datum control. However, the braking or disabling of the datum control remains effective only so long as no dangerous over-temperature occurs. We may now consider the control circuits which make these desirable control features possible.

The mode of operation of the datum control system is governed by four factors: (1) the setting of power control lever 24; (2) engine speed; (3) a pilot-operated landing switch closed when landing to partially disable the datum control; and (4) the relation of engine temperature to the scheduled value.

The power control lever 24 is coupled mechanically to switches PS1 and PS2 which remain closed at low power settings and open when the power control moves from the low power range used for starting, taxiing, and landing into the higher power range used for flight.

The movement of the fuel control lever is indicated in a general way on the drawing on the assumption that its full range of movement is from an off position at 0 degrees to a full power position at 90 degrees and that, in normal operation of the aircraft in flight, the power lever is between the 60 degree and 90 degree positions. The power lever is illustrated as being in the higher power range between 60 degrees and 90 degrees.

Control lever 24 is also coupled mechanically to movable contact 61 of a temperature scheduling potentiometer 62 by which engine temperature is varied from a relatively low value at low power settings in the flight range to the maximum allowable value at maximum power settings.

The direction of movement of contact 61 is indicated by the legends "60°" and "90°" at the ends of potentiometer 62 which are correlated with the indications of the position of the control lever 24.

Engine speed reacts on the datum control system through a speed-responsive switch device SS driven from the auxiliary shaft 22. Switch SS remains closed until engine speed reaches a value about 94% of rated value, below the operating speed of the engine in flight. Switch SS energizes a speed relay RS from the 24 volt D.C. control bus 64 through line 66, switch SS, line 67, and the coil of relay RS to ground.

A pilot-operated landing switch LS, normally open, is closed when landing to energize landing relay RL from bus 64.

As previously stated, amplifier 56 develops an output signal based upon the difference between engine temperature sensed by thermocouples 54 and the temperature signal transmitted by potentiometer group 52. Over-temperature creates a potential in line 71 which leads to "take" coil T through rectifier 72 and to overtemperature relay coil RT.

The interaction of power lever position, engine speed, overtemperature, and landing switch position on the operation of the system is rather complex, and will be discussed after a description of the normal fuel regulating control operation.

Consider now the operation of the potentiometer circuit 52 which develops the reference voltage which acts in opposition to the temperature signal generated by the thermocouples 54 to control, through the amplifier, the operation of the temperature datum valve 30. The potentiometer group 52 is connected between the thermocouples and the amplifier by lines 58 and 59, respectively, which constitute two buses of the potentiometer group. Line 58 is connected to one terminal of an accurate source of fixed reference voltage which may, in practice, be derived from the power pack of the amplifier, but which is represented schematically by the battery 76. The other terminal of battery 76 is connected in normal operation through line 74, a back contact of a cutout relay RC, and a resistance 81 to the variable tap 79 of potentiometer 78. Potentiometer 78 is connected between bus 58 and the variable tap 61 of the temperature control potentiometer 62. Potentiometer 62 is connected to bus 59 and through variable resistance 77 to bus 58. The potential difference between lines 59 and 58 will be determined by the settings of the potentiometers 77, 78 and 62. The fixed potential from the source 76 is divided by the resistor 81 and the portion of potentiometer 78 between slider 79 and bus 58. The potential between slider 79 and bus 58 is also divided by the other portion of potentiometer 78 and the portions of potentiometers 62 and 77 in the circuit through these potentiometers to bus 58. The potential of the slider 61 is applied to line 59 without any significant drop, since there is no significant current flow in line 59 which acts as the amplifier input.

By varying the position of slider 79, which determines the current through slider 61, the left portion of potentiometer 62, and potentiometer 77, the slope characteristic of potentiometer 62, that is, the relation between displacement of slider 61 and potential (which determines engine temperature) is adjusted. Varying the position of the slider on potentiometer 77 varies the potential drop in this potentiometer which adds to the drop in potentiometer 62 and thus serves as a range adjustment by increasing the ordinates of the curve of potential against displacement of the potentiometer 62.

In summary, potentiometer 62 transmits the desired temperature to the amplifier and potentiometers 77 and 78 serve respectively to vary the datum point and the slope of the output line of potentiometer 62.

If the potential taken off the potentiometer group equals that generated by the thermocouples, the amplifier input on lines 57 and 59 will be zero, since these are connected in opposition. An excess or deficiency of engine temperature is reflected by higher or lower potentials, respectively, on line 57 than on line 59. Excessive temperature results in energization of the T coil to open the by-pass 35 and decrease fuel flow to the engine. Deficiency in temperature results in energization of the P coil which drives the motor to close the by-pass and put more fuel into the engine. Under normal flight conditions the scheduled engine temperature increases from a minimum value at lower power settings to a maximum value at maximum power settings. The slider 61 thus moves to the right to increase potential as the power setting is increased in the flight range.

The potentiometer group 52 also includes potentiometers 82 and 83 connected between busses 58 and 59 which may be set or adjusted to transmit desired temperature signals independently of slider 61. These potentiometers normally control when starting the engine and in the taxi range and the lower range of the flight power settings. Throughout this range of operation the pilot switches PS1 and PS2 are closed, opening at about 60° travel of the control lever 24, at which point normal temperature datum control is initiated. Potentiometer 82 is set to the maximum limiting temperature for normal engine operation, corresponding to the maximum signal which can be derived from the potentiometer 62 at the maximum power position of lever 24. Potentiometer 83 is set at a considerably lower degree of temperature to protect the engine during starting. This temperature, however, may be greater than the minimum operating temperature available from potentiometer 62. The sliders of potentiometers 82 and 83 are connected through resistors 84 and 85, respectively, to back and front contacts, respectively, of speed relay RS which connects one or the other of these to a lead 86 running to a front contact of cutout relay RC. Relay RS is energized by speed switch SS when the engine is below 94% of rated speed. It will be apparent, therefore, that potentiometer 83 is active in starting the engine. However, in normal operation, including taxiing, the engine speed is above 94% so that potentiometer 82 is connected to line 86.

Cutout relay RC connects either line 86 and thus potentiometer 82 or 83, or resistor 81 and thus slider 61, to the fixed potential line 74. The coil of cutout relay RC is energized through a front contact of speed relay RS and line 88 whenever engine speed is below the normal operating range so that, when starting, the potentiometer 83 is in control.

Cutout relay RC is also energized from bus 64 through line 89, switch PS1, and line 88 as long as the control lever is in the starting and taxiing range; thus, the engine starts under control of potentiometer 83, is switched over to potentiometer 82 by the speed relay RS at 94% rated speed, and remains there until the control lever 24 is advanced into the takeoff and normal flight range, at which time the circuit through PS1 and coil of RC is also braken to complete the circuit from potentiometer 62 to the amplifier.

*Temperature limiting control*

The cutout feature of the invention; that is, the feature involving disabling of the "put" circuits of the datum control so that the control acts only to limit temperature and will not increase it, is also employed during starting. The main fuel control 17 of the engine is particularly adapted to schedule fuel to the engine when it is starting so as to avoid surge. If the datum control were allowed to override the main fuel control and supply additional fuel to the engine because its temperature has not reached a normal operating value, unsatisfactory starting would result. The mechanism by which the "put" circuits may be disabled is shown schematically. The "put" output line 91 of the amplifier is connected through a rectifier 92, lead 93, a front contact of cutout relay RC, and lead 94 to the "take" coil T. When the contact is closed over-temperature signals in line 71 can flow into the T coil through rectifier 72 and to ground. These signals cannot enter the P coil because they are blocked by rectifier 92. Therefore, the motor functions normally to open valve 30 in the event of over-temperature. However, if temperature sensed by the thermocouples is below that called for by the potentiometer group, amplifier output on line 91 flows in two parallel circuits to ground; one directly through the P coil, the other through rectifier 92, line 93, front contact of RC, line 94, and the T coil. These coils are thus energized concurrently, and the result is balanced excitation so that the motor does not move off its null position in response to an under-temperature signal. Cutout relay RC is energized to close its front contacts, as previously stated, by switch SS and speed relay RS when engine speed is below 94% rated and by switch PS1 when the power setting is below the take-off and flight range.

*Temperature datum lockout*

Another phase or mode of operation of the control arises in landing. It has been found desirable to eliminate the regulating action of the temperature datum control when the airplane is coming in for a landing with power setting at flight idle (substantially zero power output). It is not desirable, however, merely to cut out and disable the datum control altogether, as this allows the by-pass valve 32 to return to its null position. Assuming that the engine has been operating on a fuel that resulted in the datum valve being driven to modify substantially the metered output of the fuel control, the fuel supply to the engine would be considerably disturbed and most of the advantages of the datum control would be lost if it were merely deenergized and allowed to go to its null position. However, for example, if the datum control has been withdrawing 10% of the metered fuel in flight, it may be desirable to continue to withdraw this portion of fuel as the plane lands. This way the main fuel control 17 regulates the changes of fuel rate of the engine as it encounters the rapid changes in ambient conditions as it lands. The main control is better adapted to maintain the engine in a constant low power mode of operation than the temperature datum control, but it is benefited if the correction for fuel characteristics set by the datum control is maintained.

In order to lock into the datum control the particular percentage value of by-pass under which it is operating, brake coil 60 is de-energized, whereupon the brake 60 is applied by a spring or the like (not illustrated). This is effected under the initial control of the landing switch LS and the landing relay RL energized by it, to which reference previously has been made. In normal flight relay RL is de-energized, and its back contact closes a circuit from the bus 64 through line 96 which energizes brake solenoid 60 to hold the brake disengaged. Energization of RL breaks this circuit, and there is normally under flight conditions no other energizing circuit for the brake solenoid. Thus, before the pilot chops his throttle for the landing approach, he closes switch LS to lock the correction existing in the datum control. Ordinarily, the landing is completed with the datum control valve 30 locked.

However, it is inadvisable to sacrifice over-temperature protection, so the system according to the invention includes means for disabling the brake and permitting the datum control to reduce fuel supply if the engine temperature exceeds a safe value. This is accomplished in the first instance by over-temperature relay RT which is connected to the "take" output line 71 of the amplifier which is energized whenever engine temperature exceeds that called for. Relay RT closes a circuit from the bus 64 to a line 97 through which the coil of brake lockout relay RB is energized. When relay RB is energized it closes a circuit from bus 64 through line 98, front contacts of RB, and line 96, thus energizing and releasing the brake. Relay RB also closes a holding circuit from the relay coil through line 97, front contact of relay RB, line 99, and front contacts of the energized landing relay RL to the bus 64. It is apparent therefore that the brake once released remains locked out or released as long as the landing switch is closed. The locking out of the brake is indicated by signal light 101 visible to the pilot which is energized from bus 64 through front contacts of RL, line 88, front contacts of brake lockout relay RB and line 102.

It may be pointed out that the temperature to which the engine is limited during the landing operation with relay RL energized is the maximum limiting temperature set by fixed potentiometer 82 and not that scheduled by the variable potentiometer 62. Energization of line 88 through front contacts of landing relay RL holds relay RC energized to complete a circuit from the fixed potential source 76 through front contacts of RC, line 86, back contacts of speed relay RS (the relay being de-energized at normal engine speed), and resistor 84 to potentiometer 82. Thus, the temperature datum control is not unbraked by the occurrence of a temperature above that scheduled by potentiometer 62 in accordance with power lever position, but will be unbraked in the event the temperature is above the maximum allowed temperature as set in potentiometer 82.

*Air starts*

The speed switch SS and associated relay RS are instrumental in assuring satisfactory air starts by windmilling the propeller at power lever settings in the flight range. If the engine is thus started by windmilling relay RS is energized until the engine reaches normal operating speed, thus energizing through its front contact and line 88 the coil of cutout relay RC. Also, through front contacts of RS starting limiting temperature potentiometer 83 is connected to the amplifier which thus operates in temperature limiting control under the lower temperature limit during the start.

It is believed the operation of the control under various conditions of operation of the aircraft such as starting the engine, normal flight, and flight idle for landing has been fully described and no résumé of the operation is needed. It will be apparent that the control system of the invention makes the engine adaptable to fuels of varying characteristics by controlling the engine under normal flight conditions to the desired temperatures, which thus eliminates the effects of variations in fuel density and heat value which are not compensated for by the main fuel control. It also, by providing for operation in a temperature limiting mode and operation with the datum valve locked as described above, eliminates certain disadvantages of the system described in the McDowall application Serial No. 462,188. Starting of the engine, and balance of the engines and their response to quickly changing ambient conditions during landing, are not upset by the fuel adding operation of the datum control when it is cut out under these conditions.

The adjustment of the null point of the temperature datum valve 30 by movement of the wall 31 can be utilized to align the system more closely to the characteristics of any given fuel. Thus, for any given fuel, the control may be adjusted so that the temperature datum valve ordinarily remains in or near its null position, with a minimum of correction for disparities between the fuel for which the main fuel control is calibrated and that with which the engine is being operated.

The detailed description herein of the preferred embodiment of the invention for the purpose of explaining the principles thereof is not to be considered as limiting or restricting the invention, since many modifications may be made by the exercise of skill in the art within the principles of the invention.

We claim:

1. In a fuel supply system adapted to be connected to an engine, in combination, fuel metering means; temperature responsive means responsive to an engine temperature indicative of engine fuel requirements coupled thereto adapted to vary increasingly and decreasingly the output of the metering means; means responsive to an engine condition coupled to the temperature-responsive means to limit it to unidirectional variation; means coupled to the temperature-responsive means adapted to lock it against variation in either direction; and means sensitive to an engine condition indicative of engine fuel requirements for disabling the locking means.

2. In a fuel supply system adapted to be connected to an engine, in combination, fuel metering means; temperature responsive means responsive to an engine temperature indicative of engine fuel requirements coupled thereto adapted to vary increasingly and decreasingly the output of the metering means; means coupled to the temperature-responsive means to limit it to unidirectional variation; optionally operable means coupled to the temperature-responsive means adapted to lock it against variation in either direction; and means sensitive to an engine condition indicative of engine fuel requirements for disabling the locking means.

3. In a fuel supply system adapted to be connected to an engine, in combination, fuel metering means; temperature responsive means responsive to an engine temperature indicative of engine fuel requirements coupled thereto adapted to vary increasingly and decreasingly the output of the metering means; means coupled to the temperature-responsive means adapted to limit it to unidirectional variation; means coupled to the temperature-responsive means adapted to lock it against variation in either direction; and means sensitive to an engine condition indicative of engine fuel requirements for disabling the locking means.

4. A fuel supply system as recited in claim 3 in which the last-recited means is sensitive to a temperature in the engine.

5. A fuel supply system as recited in claim 3 in which the last-recited means is sensitive to engine speed.

6. An engine fuel supply system comprising, in combination, means responsive to engine overtemperature for reducing the rate of fuel supply; means responsive to engine undertemperature for increasing the rate of fuel supply; and means responsive to engine speed operative upon decrease in speed below a predetermined value to suspend operation of the means for increasing the fuel supply while leaving the means for reducing the rate of fuel supply in operation.

7. An engine fuel supply system comprising, in combination, means responsive to engine overtemperature for reducing the rate of fuel supply; means responsive to engine undertemperature for increasing the rate of fuel supply; and means responsive to engine power setting operative upon decrease in power setting below a predetermined level to suspend operation of the means for increasing the fuel supply while leaving the means for reducing the rate of fuel supply in operation.

8. An engine fuel supply system comprising, in combination, means responsive to engine overtemperature for reducing the rate of fuel supply; means responsive to engine undertemperature for increasing the rate of fuel supply; and means operable manually independently of engine power setting for suspending operation of the means for increasing the fuel supply while leaving the means for reducing the rate of fuel supply in operation.

9. An engine fuel supply system comprising, in combination, means for reducing the rate of fuel supply; means sensitive to engine temperature; first means establishing a desired engine temperature; control means, responsive to the sensitive means and the first means, actuating the reducing means; means for disabling the reducing means; and means, actuated by the control means upon excess of engine temperature above a predetermined value, for cutting out the disabling means.

10. An engine fuel supply system comprising, in combination, means for reducing the rate of fuel supply; means sensitive to engine temperature; first means establishing a first desired engine temperature variable to vary the power output of the engine; second means establishing a second, fixed, desired engine temperature; control means, normally responsive to the sensitive means and the first means, actuating the reducing means; means for disabling the reducing means; means actuated by the disabling means for coupling the control means to the second means in place of the first means; and means, actuated by the control means upon excess of engine temperature above that established by the second means, for cutting out the disabling means.

11. An engine fuel supply system comprising, in combination, means for reducing the rate of fuel supply; means sensitive to engine temperature; first means establishing a first desired engine temperature; second means establishing a second desired engine temperature; control means, normally responsive to the sensitive means and the first means, actuating the reducing means; means for disabling the reducing means; means actuated by the disabling means for coupling the control means to the second means in place of the first means; and means, actuated by the control means upon excess of engine temperature above that established by the second means, for cutting out the disabling means.

12. A fuel system for a gas turbine engine comprising, in combination, a fuel control adapted to meter fuel to the engine in accordance with power requirements and engine characteristics; a temperature datum control capable of modifying the output of the fuel contol; means responsive to engine temperature; means establishing a scheduled temperature; power means actuated by the aforementioned means coupled to the datum contol to vary the output, the power means being adapted to vary the said output in either direction from a null value; engine speed-responsive means; means for restricting the datum control to operation only in that direction from the null point resulting in reduction of fuel supplied to the engine; and means for activating the restricting means coupled to the speed responsive means so as to be operable below a predetermined engine speed.

13. A fuel system for a gas turbine engine comprising, in combination, a fuel control adapted to meter fuel to the engine in accordance with power requirements and engine characteristics; a temperature datum control capable of modifying the output of the fuel control; means responsive to engine temperature; means establishing a scheduled temperature; power means actuated by the aforementioned means coupled to the datum control to vary the output; the power means being adapted to vary the said output in either direction from a null value; input means coupled to the fuel control for establishing engine power requirements; means coupling the input means to the temperature scheduling means for variation thereof; means for restricting the datum control to operation only in that direction from the null point resulting in reduction of fuel supplied to the engine; and means for activating the restricting means coupled to the input means so as to be operable below a predetermined power setting.

14. A fuel system for a gas turbine engine comprising, in combination, a fuel control adapted to meter fuel to the engine in accordance with power requirements and engine characteristics; a temperature datum control capable of modifying the output of the fuel control; means responsive to engine temperature; means establishing a scheduled temperature; power means actuated by the aforementioned means coupled to the datum control to vary the output, the power means being adapted to vary the said output in either direction from a null value; input means coupled to the fuel control for establishing engine power requirements; means coupling the input means to the temperature scheduling means for variation thereof; engine speed-responsive means; means for restricting the datum control to operation only in that direction from the null point resulting in reduction of fuel supplied to the engine; and means for activating the restricting means coupled to the input means so as to be operable below a predetermined power setting and coupled to the speed responsive means so as to be operable below a predetermined engine speed.

15. A fuel system for a gas turbine engine comprising, in combination, a fuel control adapted to meter fuel to the engine in accordance with power requirements and engine characteristics; a temperature datum control capable of modifying the output of the fuel control; means responsive to an engine temperature indicative of engine fuel requirements; means establishing a scheduled temperature; power means actuated by the aforementioned means coupled to the datum control to vary the output; the power means being adapted to vary the said output in either direction from a null value; and means for locking the datum control.

16. A fuel system for a gas turbine engine comprising, in combination, a fuel control adapted to meter fuel to the engine in accordance with power requirements and engine characteristics; a temperature datum control capable of modifying the output of the fuel control; means responsive to an engine temperature indicative of engine fuel requirements; means establishing a scheduled temperature; power means actuated by the aforementioned means coupled to the datum control to vary the output; the power means being adapted to vary the said output in either direction from a null value; means for locking the datum control; and means responsive to an engine condition indicative of engine fuel requirements coupled to the locking mean adapted to disable the locking means.

17. A fuel sytem for a gas turbine engine comprising, in combination, a fuel control adapted to meter fuel to the engine in accordance with power requirements and engine characteristics, a temperature datum control capable of modifying the output of the fuel control, means responsive to engine temperature, means establishing a scheduled temperature, power means actuated by the aforementioned means coupled to the datum control to vary the output thereof, the power means being adapted to vary the said output in either direction from a null value, means for locking the datum control at any point in the range thereof, and means responsive to engine temperature coupled to the locking means adapted to disable the locking means upon occurrence of engine temperature above a predetermined value.

18. A fuel control system for a gas turbine engine comprising, in combination, means for supplying fuel to the engine; engine temperature responsive means; temperature signalling means; means responsive to the relative conditions of the temperature responsive and temperature signalling means coupled to the fuel supplying means for regulating the rate of fuel supply to the engine; the temperature signalling means comprising a manually variable transmitting device and two preset transmitting devices; means sensitive to engine speed; manually actuatable control means; first transfer means actuated by the manually actuatable control means; second transfer means; the first transfer means being adapted to couple the responsive means alternatively to the variable transmitting device and the second transfer means; the second transfer means being adapted to couple the responsive means alternatively to the preset transmitting devices; and means coupling the second transfer means to the speed-sensitive means for operation thereby.

19. A fuel control system for a gas turbine engine comprising, in combination, means for supplying fuel to the engine; engine temperature responsive means; temperature signalling means; means responsive to the relative conditions of the temperature responsive and temperature signalling means coupled to the fuel supplying means for regulating the rate of fuel supply to the engine; the temperature signalling means comprising a manually variable transmitting device and two preset transmitting devices; engine power setting means; means sensitive to engine speed; first transfer means actuated by the engine power setting means; second transfer means; the first transfer means being adapted to couple the responsive means alternatively to the variable transmitting device and the second transfer means; the second transfer means being adapted to couple the responsive means alternatively to the preset transmitting devices; and means coupling the second transfer means to the speed-sensitive means for operation thereby.

20. A fuel control system for a gas turbine engine comprising, in combination, means for supplying fuel to the engine; engine temperature responsive means; temperature signalling means; means responsive to the relative conditions of the temperature responsive and temperature signalling means coupled to the fuel supplying means for regulating the rate of fuel supply to the engine; the temperature signalling means comprising a manually variable transmitting device and two preset transmitting devices; engine power setting means; means sensitive to engine speed; manually actuatable control means; first transfer means actuated by the engine power setting means and the manually actuatable control means; second transfer means; the first transfer means being adapted to couple the responsive means alternatively to the variable transmitting device and the second transfer means; the second transfer means being adapted to couple the responsive means alternatively to the preset transmitting devices; and means coupling the second transfer means to the speed-sensitive means for operation thereby.

21. A fuel control system for a gas turbine engine comprising, in combination, means for supplying fuel to the engine; engine temperature responsive means; temperature signalling means; means responsive to the relative conditions of the temperature responsive and temperature signalling means coupled to the fuel supplying means for regulating the rate of fuel supply to the engine; the temperature signalling means comprising a manually variable transmitting device and two preset transmitting devices; engine power setting means; means sensitive to engine speed; manually actuatable control means; first transfer means actuated by the engine power setting means, the speed sensitive means, and the manually actuatable control means; second transfer means; the first transfer means being adapted to couple the responsive means alternatively to the variable transmitting device and the second transfer means; the second transfer means being adapted to couple the responsive means alternatively to the preset transmitting devices; and means coupling the second transfer means to the speed-sensitive means for operation thereby.

22. An engine fuel supply system comprising in combination, means responsive to engine overtemperature for reducing the rate of fuel supply; means responsive to engine undertemperature for increasing the rate of fuel supply; means responsive to engine speed operable upon reduction of speed below a predetermined value; means responsive to engine power setting operable upon reduction of the power setting below a predetermined level; cutout means operable manually independently of engine power setting; and means coupling the speed-responsive means, the power setting responsive means, and the cutout means to the means for increasing the fuel supply, the coupling means being effective to suspend operation of the means for increasing the fuel supply upon operation of any one of the following: the speed responsive means, the power setting responsive means, and the cutout means.

23. An engine fuel supply system comprising, in combination, means responsive to engine overtemperature for reducing the rate of fuel supply; means responsive to engine undertemperature for increasing the rate of fuel supply; means responsive to engine speed operable upon reduction of speed below a predetermined value; means responsive to engine power setting operable upon reduction of the power setting below a predetermined level; and means coupling the speed-responsive means and the power setting responsive means to the means for increasing the fuel supply, the coupling means being effective to suspend operation of the means for increasing the fuel supply upon operation of either of the speed responsive means and the power setting responsive means.

References Cited in the file of this patent

UNITED STATES PATENTS

| | | |
|---|---|---|
| 2,623,354 | Best | Dec. 30, 1952 |
| 2,690,647 | Woodward | Oct. 5, 1954 |

FOREIGN PATENTS

| | | |
|---|---|---|
| 1,011,785 | France | Apr. 9, 1952 |